United States Patent

[11] 3,592,117

| [72] | Inventor | Masahiro Fukuda<br>Tokyo, Japan |
|---|---|---|
| [21] | Appl. No. | 845,449 |
| [22] | Filed | July 28, 1969 |
| [45] | Patented | July 13, 1971 |
| [73] | Assignee | Fuji Photo Film Co., Ltd<br>Ashigara-Kamigun, Kanagawa, Japan |
| [32] | Priority | Aug. 28, 1968 |
| [33] | | Japan |
| [31] | | 43/61626 |

[54] GRIP OF A CAMERA
3 Claims, 3 Drawing Figs.

[52] U.S. Cl. .................................................. 95/86,
88/1.5, 352/243
[51] Int. Cl. ........................................................ G03b 17/56
[50] Field of Search .......................................... 88/1.5 NR;
95/86; 352/243

[56] References Cited
UNITED STATES PATENTS

| 1,933,784 | 11/1933 | Wittel | 88/1.5 |
| 2,495,223 | 1/1950 | Bodlander | 95/11 |
| 2,660,103 | 11/1953 | Culp | 352/243 |

Primary Examiner—Samuel S. Matthews
Assistant Examiner—Michael D. Harris
Attorney—Sughrue, Rothwell, Mion, Zinn & MacPeak ABSTRACT: A U-shaped grip carrying a viewfinder is pivotally mounted to the camera. The grip is used as a grip for supporting the camera when not taking the picture and acts as a lens cover when carrying the camera but is used as a viewfinder when taking pictures.

PATENTED JUL 13 1971　　3,592,117

GRIP OF A CAMERA

BACKGROUND OF THE INVENTION

1. FIELD OF THE INVENTION

The present invention relates to a novel grip of the camera which can be used as a lens cover and as a viewfinder.

2. Description of the Prior Art

It is known to form a holdable camera grip which may be used as a viewfinder but the known grips are fixedly mounted to the camera body. Therefore, it cannot be used as a lens cover, and the overall size of the camera is rather large since the grip portion carries the viewfinder optical elements. The camera grip should be foldable or rotatable so as to be moved into a position where the overall size of the camera is made smaller when not using the same.

SUMMARY OF THE INVENTION

In accordance with the present invention, a camera grip is pivotally or rotatably mounted on the camera body and is provided with viewfinder optical elements. When the camera is not used for taking pictures, the grip is set at the closed position where the grip serves as a lens cover of the camera lens. Thus, the size of the camera as a whole is made smaller when it is not being used.

The present invention provides a novel grip for a camera which is rotatable to at least two positions, one of which is a closed position where the grip covers the picture-taking lens of the camera body, and the other of which is a position where the grip is moved out of the optical axis of the picture-taking lens. The present invention further provides a novel camera grip which has the viewfinder optical elements carried thereon.

DESCRIPTION OF THE PREFERRED EMBODIMENTS

Figure 1:
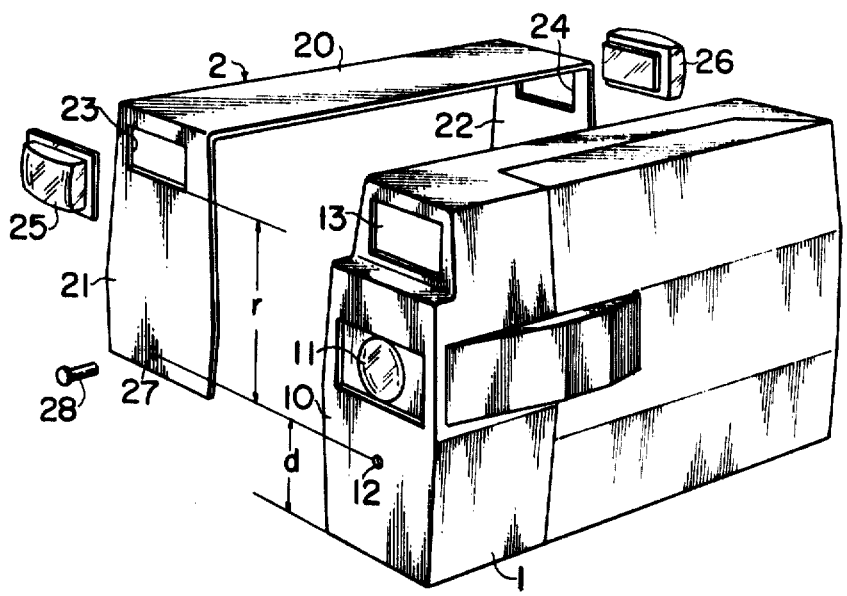
FIG. 1 is an exploded perspective view of the movie camera provided with the grip in accordance with the present invention.
Figure 2:
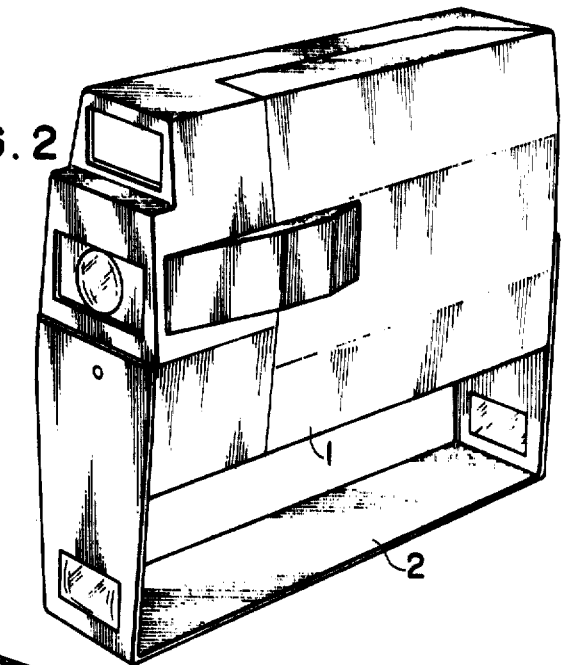
FIG. 2 is a perspective view of the camera with the grip set at the picture-taking position.
Figure 3:
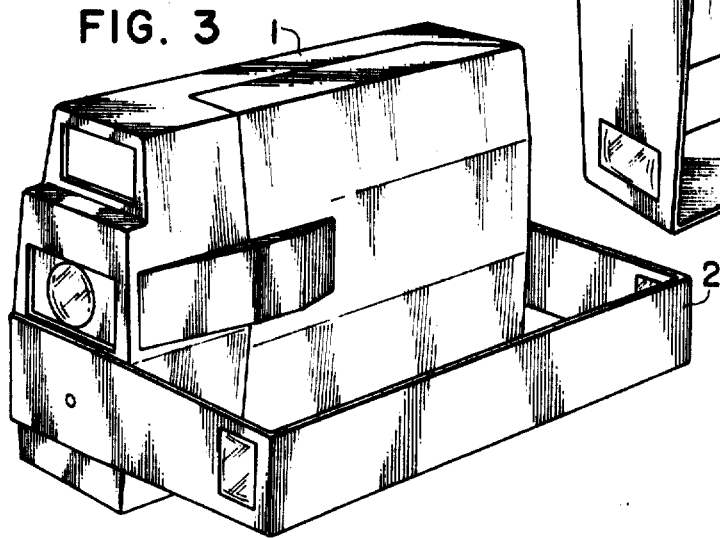
FIG. 3 is a perspective view of the camera with the grip set at a horizontal position.

Referring to Figure 1 showing one embodiment of the grip of the camera, a U-shaped grip member 2 is pivotally mounted to the camera body 1. The grip member 2 is rotatable about an axis parallel to the optical axis of the picture-taking lens of the camera. The U-shaped grip 2 is mounted to the camera body 1 at both ends of the grip 2. That is, one of the ends of the grip 2 is pivotally mounted to the front face 10 and the other end is pivotally mounted to the rear face of the camera body. The U-shaped grip member 2 comprises a central grip portion 20 and a pair of arm portions 21, 22 connected to the grip portion 20 at opposite ends thereof and perpendicularly thereto. The arm portions 21, 22 are provided with viewfinder apertures 23, 24 respectively, and lenses 25, 26 for viewfinder apertures are mounted therein. Respective arms 21, 22 carry pivotal holes, such as 27. Pivots 28, such as pins, fit holes 27 and are centrally offset on the front face 10 and the rear face of the camera body 1. The position of each pivot pin 28 is slightly nearer to the bottom of the camera body 1 than to the top thereof. In the embodiment shown in FIG. 1, a pin 28 is inserted into the hole 12 provided on the camera body and through hole 27 of the grip arm 21. The position of the hole 12 is so defined that the distance $d$ from the hole 12 to the lower end of the front face 10 of the camera body 1 is shorter than the distance $r$ from the hole 27 on the arm 21 to the viewfinder aperture 23 carried thereon. On the other arm 22, the same dimensional conditions occur, and the distance from the holes on the arms of the grip 2 to the grip portion 20 should be longer than the distance from the holes on the camera body to the top end thereof.

By rotating the grip 2 constructed as described above, the viewfinder apertures 23, 24 are brought out of the camera body and the viewfinder can be used under the camera body 1. By rotating the grip 2 upwards, the viewfinder apertures 23, 24 are brought onto the camera body 1 and the viewfinder cannot be used. In this case, the overall size of the camera is reduced.

What I claim is:

1. In a camera having a grip pivotally mounted to the camera body, the improvement comprising: a grip portion extending substantially parallel to the optical axis of the picture-taking lens of said camera, a pair of arms connected at ends thereof and extending in the orthogonal direction to said grip portion, a pair of optical elements forming a viewfinder for said camera respectively mounted on said arms, the end of said arms being pivotally mounted to the front and rear face of said camera body respectively, said arms being pivoted on the side opposite the viewfinder from said optical axis of the picture-taking lens of said camera, and the length of said arms being longer than the distance from the pivot axis of said arms to the end of said camera body nearest the picture-taking lens.

2. The grip for a camera as defined in claim 1 further including means allowing the grip to be set at right angles to said camera body.

3. The grip for a camera as defined in claim 1 having a light receiving element on one end of said camera with one of said arms adapted to simultaneously cover the camera picture-taking lens and a light-receiving element.